United States Patent
Francois et al.

(10) Patent No.: US 11,124,634 B2
(45) Date of Patent: Sep. 21, 2021

(54) RUBBER COMPOSITION COMPRISING A MODIFIED DIENE ELASTOMER

(71) Applicant: COMPAGNIE GENERALE DES ETABLISSEMENTS MICHELIN, Clermont-Ferrand (FR)

(72) Inventors: Marie-Laure Francois, Clermont-Ferrand (FR); Bênoit De-Gaudemaris, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 70 days.

(21) Appl. No.: 16/470,488

(22) PCT Filed: Dec. 19, 2017

(86) PCT No.: PCT/FR2017/053704
§ 371 (c)(1),
(2) Date: Jun. 17, 2019

(87) PCT Pub. No.: WO2018/115722
PCT Pub. Date: Jun. 28, 2018

(65) Prior Publication Data
US 2020/0123351 A1  Apr. 23, 2020

(30) Foreign Application Priority Data
Dec. 20, 2016 (FR) ..................... 1662865

(51) Int. Cl.
C08L 15/00 (2006.01)
B60C 1/00 (2006.01)
B60C 11/00 (2006.01)

(52) U.S. Cl.
CPC ............ *C08L 15/00* (2013.01); *B60C 1/0016* (2013.01); *B60C 11/0008* (2013.01); *B60C 2011/0025* (2013.01); *C08L 2312/00* (2013.01)

(58) Field of Classification Search
CPC .... C08L 15/00; C08L 2312/00; B60C 1/0016; B60C 2011/0025; B60C 11/0008
See application file for complete search history.

(56) References Cited

U.S. PATENT DOCUMENTS

| 9,908,949 | B2 * | 3/2018 | Dire .................... B01J 19/2415 |
| 2011/0178233 | A1 | 7/2011 | Chaboche et al. |
| 2016/0176991 | A1 | 6/2016 | Dire et al. |

FOREIGN PATENT DOCUMENTS

| FR | 2930554 A1 | 10/2009 |
| WO | 2015018599 A1 | 2/2015 |

OTHER PUBLICATIONS

International Search Report and Written Report corresponding to PCT/FR2017/053704 dated Mar. 29, 2018.

* cited by examiner

*Primary Examiner* — Robert D Harlan
(74) *Attorney, Agent, or Firm* — Dickinson Wright PLLC

(57) ABSTRACT

A rubber composition based on at least a reinforcing filler, a crosslinking system, a plasticizing system and an elastomer matrix is provided. The elastomer matrix includes at least one modified diene elastomer comprising within its structure at least one alkoxysilane group, which is optionally partially or totally hydrolysed to silanol, bonded to the elastomer by the silicon atom. The alkoxysilane group optionally bears another function bonded to the silicon atom directly or by means of a spacer group. The modified diene elastomer is such that, before modification, the diene elastomer has a polydispersity index of at least 1.1 and at most 1.6, and has a Mooney viscosity ranging from 50 to 80 and a glass transition temperature (Tg) of strictly less than −50° C., preferably less than or equal to −60° C., and greater than or equal to −110° C.

20 Claims, No Drawings

RUBBER COMPOSITION COMPRISING A MODIFIED DIENE ELASTOMER

This application is a 371 national phase entry of PCT/FR2017/053704 filed on 19 Dec. 2017, which claims benefit of French Patent Application No. 1662865, filed 20 Dec. 2016, the entire contents of which are incorporated herein by reference for all purposes.

BACKGROUND

1. Technical Field

The invention relates to a rubber composition comprising a diene elastomer modified by an alkoxysilane group, which is optionally partially or totally hydrolysed to silanol, and which optionally bears another function. The invention also relates to a vehicle tire comprising such a composition.

2. Related Art

Since saving fuel and the need to protect the environment have become a priority, it is desirable to produce polymers which have good mechanical properties and a hysteresis that is as low as possible in order to be able to use them in the form of rubber compositions that can be used for the manufacture of various semi-finished products which go to form tires, such as, in particular, treads directly in contact with the ground, and to obtain tires with improved properties, in particular which have reduced rolling resistance.

The reduction in the hysteresis of the mixtures is a permanent objective that must however not be achieved to the detriment of the other properties of the mixtures.

In order to achieve the objective of a decrease in hysteresis, numerous solutions have already been experimentally investigated. In particular, mention may be made of modification of the structure of diene polymers and copolymers for the purpose of polymerization by means of functionalization, coupling or star-branching agents with the aim of obtaining good interaction between the polymer thus modified and the reinforcing filler, whatever it is.

In the context of mixtures containing a reinforcing inorganic filler of siliceous type, it has in particular been proposed to use diene polymers functionalized with alkoxysilane derivatives.

It is a constant preoccupation of designers of materials intended for tire production to improve the balance of the properties of the mixtures, in particular to reduce their hysteresis with a view to further reducing the rolling resistance of the tires.

SUMMARY

Surprisingly, the inventors found that the use, in a rubber composition, of certain modified specific elastomers makes it possible to lower the hysteresis of this composition compared with a composition comprising elastomers of the same microstructure but of different macrostructure.

A subject of the invention is thus a rubber composition based on at least a reinforcing filler, a crosslinking system, a plasticizing system and an elastomer matrix comprising at least one modified diene elastomer comprising within the structure thereof at least one alkoxysilane group, which is optionally partially or totally hydrolysed to silanol, bonded to the elastomer by the silicon atom, the alkoxysilane group optionally bearing another function bonded to the silicon atom directly or by means of a spacer group, which modified diene elastomer is such that the diene elastomer has a polydispersity index of at least 1.1 and at most 1.6 before modification, and has a Mooney viscosity ranging from 50 to 80 and a glass transition temperature (Tg) of strictly less than −50° C., preferably less than or equal to −60° C., and greater than or equal to −110° C.

A subject of the invention is also a tire which comprises the tread in accordance with the invention.

A subject of the invention is also a process for producing the rubber composition in accordance with the invention.

A subject of the invention is also a process for producing the tread in accordance with the invention.

DETAILED DESCRIPTION OF EXAMPLE EMBODIMENTS

In the present description, unless expressly otherwise indicated, all the percentages (%) indicated are % by weight. The abbreviation "phr" means parts by weight per 100 parts of elastomers present in the elastomer matrix, the elastomer matrix denoting all of the elastomers present in the rubber composition.

Furthermore, any range of values denoted by the expression "between a and b" represents the range of values greater than "a" and less than "b" (that is to say limits a and b excluded), whereas any range of values denoted by the expression "from a to b" means the range of values ranging from "a" up to "b" (that is to say including the strict limits a and b).

In the present application, the term "predominantly" or "major" in connection with a compound is intended to mean that this compound is in the majority among the compounds of the same type in the composition, that is to say that it is that which represents the largest weight fraction among the compounds of the same type. Thus, for example, a major elastomer is the elastomer representing the largest weight fraction relative to the total weight of the elastomers in the composition. In the same way, a filler termed "major" is that representing the largest weight fraction relative to the total weight of all the fillers of the composition. Likewise, a functional species of a modified diene elastomer termed "major" is that representing the largest weight fraction among the functionalized species constituting the diene elastomer, relative to the total weight of the modified diene elastomer. In a system comprising a single compound of a certain type, said compound is major for the purposes of the present invention.

The expression composition "based on" should be understood in the present description to mean a composition comprising the mixture and/or the in situ reaction product of the various constituents used, some of these base constituents (for example the elastomer, the filler or other additive conventionally used in a rubber composition intended for tire manufacture) being capable of reacting, or intended to react, with one another at least partially, during the various phases of manufacture of the composition intended for tire manufacture.

In the present description, the notion of functional group comprising at least one silicon atom located within the structure of the elastomer is understood to mean a group located in the backbone of the polymer and connected thereto solely by the silicon atom. This position within the structure comprises the polymer chain ends. Thus, the end group is included in this notion.

When the functional group is located at a chain end, it will then be said that the diene elastomer is functionalized at the chain end.

When the functional group is located in the main elastomer chain, it will then be said that the diene elastomer is coupled or else functionalized in the middle of the chain, in contrast to the position "at the chain end", although the group is not located precisely at the middle of the elastomer chain. The silicon atom of this function bonds the two branches of the main chain of the diene elastomer.

When the functional group is in a central position at which at least three elastomer branches are bonded, forming a star-branched structure of the elastomer, it will then be said that the diene elastomer is star-branched. The silicon atom of this function bonds the at least three branches of the diene elastomer to one another.

It should be specified that it is known by those skilled in the art that when an elastomer is modified by reaction of a functionalization agent having more than one reactive site on the living elastomer resulting from an anionic polymerization step, a mixture of modified species of this elastomer is obtained, the composition of which depends on the modification reaction conditions and in particular on the number of reactive sites of the functionalization agent and their proportion relative to the number of living elastomer chains. This mixture comprises chain-end-functionalized, coupled, star-branched and/or nonfunctionalized species.

In the present description, the expression "functionalized linear diene elastomer" defines all of the linear functionalized species, that is to say the diene elastomer functionalized at the chain end and the diene elastomer functionalized in the middle of the chain or coupled.

Thus, the rubber composition according to the invention is based on at least a reinforcing filler, a crosslinking system, a plasticizing system and an elastomer matrix comprising at least one modified diene elastomer comprising within its structure at least one alkoxysilane group, which is optionally partially or totally hydrolysed to silanol, bonded to the elastomer by the silicon atom, the alkoxysilane group optionally bearing another function bonded to the silicon atom directly or by means of a spacer group, which modified diene elastomer:

has a Mooney viscosity ranging from 50 to 80,
has a glass transition temperature (Tg) of strictly less than −50° C., preferably less than or equal to −60° C., and greater than or equal to −110° C.,
is such that, before modification, the diene elastomer has a polydispersity index of at least 1.1 and at most 1.6.

The elastomer matrix of the rubber composition in accordance with the invention comprises a modified diene elastomer comprising within its structure at least one alkoxysilane group, bonded to the elastomer by means of the silicon atom, optionally bearing another function.

The term "diene elastomer" should be understood to mean, as is known, an (intended to mean one or more) elastomer at least partially derived (i.e. a homopolymer or copolymer) from diene monomers (monomers bearing two conjugated or nonconjugated, carbon-carbon double bonds). More particularly, the term "diene elastomer" is intended to mean any homopolymer obtained by polymerization of a conjugated diene monomer having 4 to 12 carbon atoms, or any copolymer obtained by copolymerization of one or more dienes conjugated to one another or with one or more vinylaromatic compounds having from 8 to 20 carbon atoms.

Suitable conjugated dienes that can be used in the process in accordance with the invention are in particular 1,3-butadiene, 2-methyl-1,3-butadiene, 2,3-di($C_1$ to $C_5$ alkyl)-1,3-butadiene, such as for example 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene and 2,4-hexadiene, etc.

Suitable vinylaromatic compounds are in particular styrene, ortho-, meta- or para-methylstyrene, the "vinyltoluene" commercial mixture, para(tert-butyl)styrene, methoxystyrenes, vinylmesitylene, divinylbenzene and vinylnaphthalene, etc.

The diene elastomer is preferentially selected from the group of highly unsaturated diene elastomers consisting of polybutadienes (BRs), synthetic polyisoprenes (IRs), butadiene copolymers, in particular copolymers of butadiene and of a vinylaromatic monomer, isoprene copolymers and the mixtures of these elastomers. Such copolymers are more particularly butadiene/styrene copolymers (SBRs), isoprene/butadiene copolymers (BIRs), isoprene/styrene copolymers (SIRs) and isoprene/butadiene/styrene copolymers (SBIRs). Among these polymers, the butadiene/styrene copolymers (SBRs) are particularly preferred.

The diene elastomer can have any microstructure which depends on the polymerization conditions used, taking into account the characteristics imposed by the Tg of the elastomer. The elastomer may be a block, statistical, sequential, microsequential, etc. elastomer. In the case of a copolymer based on a diene and on a vinylaromatic, in particular containing butadiene and styrene, the two monomers are preferentially distributed statistically.

Particularly suitable as a butadiene/styrene copolymer is a butadiene/styrene copolymer having a vinyl-unit content relative to the diene portion ranging from 8% to 25% by weight, preferably ranging from 10% to 25% by weight, and a styrene content of at most 20%.

Also particularly suitable as a butadiene/styrene copolymer is a butadiene/styrene copolymer having a vinyl-unit content relative to the diene portion ranging from 8% to 15% by weight, preferably ranging from 10% to 15% by weight, and a styrene content of at most 5%.

In certain variants of the invention, the modified diene elastomer has a glass transition temperature (Tg) of greater than or equal to −110° C. and less than −95° C.

According to other variants of the invention, the modified diene elastomer has a glass transition temperature (Tg) of greater than or equal to −95° C. and less than −80° C.

According to yet other variants of the invention, the modified diene elastomer has a glass transition temperature (Tg) of greater than or equal to −80° C. and less than −60° C.

The modified diene elastomer according to the invention comprises within its structure at least one alkoxysilane group bonded to the elastomer by means of the silicon atom, said alkoxysilane group optionally bearing another function.

Preferentially, the diene elastomer consists predominantly of a chain functionalized in the chain middle.

According to one particularly advantageous implementation of the invention, the modified diene elastomer comprises at least 70% by weight, relative to the total weight of the modified diene elastomer, of linear diene elastomer functionalized by an alkoxysilane group bonded to the elastomer by means of the silicon atom, said alkoxysilane group optionally bearing another function. Preferentially, the modified diene elastomer comprises at least 75%, or even 80%, by weight, relative to the total weight of the modified diene elastomer, of functionalized linear diene elastomer.

According to this implementation, the functionalized linear diene elastomer is preferably predominantly functionalized in the chain middle by the alkoxysilane group, which is optionally partially or totally hydrolysed to silanol, the silicon atom bonding the two branches of the diene elastomer. Even more preferentially, the diene elastomer functionalized in the chain middle by an alkoxysilane group represents at least 80% by weight of the functionalized linear diene elastomer.

According to this implementation of the invention, the modified diene elastomer advantageously comprises at most 30% by weight, relative to the total weight of the modified diene elastomer, of a diene elastomer star-branched with tin or with silicon. Preferentially therefore, the modified diene elastomer according to the invention comprises at most 25%, or even at most 20%, by weight, relative to the total weight of the modified diene elastomer, of the star-branched diene elastomer. Also preferentially, the modified diene elastomer comprises at least 5% by weight, relative to the total weight of the modified diene elastomer, of the diene elastomer star-branched with tin or with silicon.

According to this other implementation of the invention, the star-branched diene elastomer is advantageously a diene elastomer star-branched with silicon. Preferentially, the silicon atom substituted with three branches of the diene elastomer bears another function.

According to one particularly preferred implementation of the invention, in the alkoxysilane group, the silicon atom is substituted with one or two alkoxy groups of formula R'O—, optionally partially or totally hydrolysed to hydroxyl, where R' represents a substituted or unsubstituted, $C_1$-$C_{10}$, or even $C_1$-$C_8$, alkyl group, preferably a $C_1$-$C_4$ alkyl group, more preferentially a methyl or ethyl group.

The modified diene elastomer according to the invention also comprises at least one other function. This other function is understood to comprise at least one heteroatom selected from N, S, O and P. By way of example, mention may be made, among these functions, of cyclic or non-cyclic, primary, secondary or tertiary amines, isocyanates, imines, cyanos, thiols, carboxylates, epoxides or primary, secondary or tertiary phosphines.

Thus, by way of secondary or tertiary amine function, mention may be made of amines substituted with $C_1$-$C_{10}$ alkyl, preferably $C_1$-$C_4$ alkyl, radicals, more preferentially a methyl or ethyl radical, or else the cyclic amines forming a heterocycle containing a nitrogen atom and at least one carbon atom, preferably from 2 to 6 carbon atoms. For example, methylamino-, dimethylamino-, ethylamino-, diethylamino-, propylamino-, dipropylamino-, butylamino-, dibutylamino-, pentylamino-, dipentylamino-, hexylamino-, dihexylamino- and hexamethyleneamino-groups are suitable, preferably diethylamino- and dimethylamino-groups.

By way of imine function, mention may be made of ketimines. For example, (1,3-dimethylbutylidene)amino-, (ethylidene)amino-, (1-methylpropylidene)amino-, (4-N,N-dimethylaminobenzylidene)amino-, (cyclohexylidene) amino-, dihydroimidazole and imidazole groups are suitable.

Thus, by way of carboxylate function, mention may be made of acrylates or methacrylates. Such a function is preferably a methacrylate.

By way of epoxide function, mention may be made of epoxy or glycidyloxy groups.

By way of secondary or tertiary phosphine function, mention may be made of phosphines substituted with $C_1$-$C_{10}$ alkyl, preferably $C_1$-$C_4$ alkyl, radicals, more preferentially a methyl or ethyl radical, or else diphenylphosphine. For example, methylphosphino-, dimethylphosphino-, ethylphosphino-, diethylphosphino-, ethylmethylphosphino- and diphenylphosphino-groups are suitable.

According to the second variant of the invention, the other function may be directly bonded to the silicon atom which is itself directly bonded to the diene elastomer.

According to the second variant of the invention, the other function and the silicon atom directly bonded to the diene elastomer may be bonded by means of a spacer group which may be an atom or a group of atoms. The spacer group may be a saturated or unsaturated, cyclic or non-cyclic, linear or branched, divalent $C_1$-$C_{18}$ aliphatic hydrocarbon-based radical, or a divalent $C_6$-$C_{18}$ aromatic hydrocarbon-based radical and may contain one or more aromatic radicals and/or one or more heteroatoms. The hydrocarbon-based radical may optionally be substituted.

Preferably, the spacer group is a linear or branched, divalent $C_1$-$C_{18}$ aliphatic hydrocarbon-based radical, even more preferentially the linear divalent $C_2$ or $C_3$ hydrocarbon-based radical.

The various preferential or non-preferential aspects above and which relate in particular to the nature of the other function, the nature of the spacer group, the nature of the diene elastomer, the nature of the alkoxysilane group and the proportions of the various species, can be combined with one another provided that they are compatible.

Thus, according to one particularly advantageous implementation of the invention, the modified diene elastomer has at least any one of the following features, or even at least two, at least three, at least four or at least five, and preferably all of the following features:

the modified diene elastomer comprises at least 70%, preferably at least 75%, by weight of the linear diene elastomer functionalized predominantly in the chain middle, relative to the total weight of the modified diene elastomer, the modified diene elastomer comprises at most 30%, preferably at most 25%, relative to the total weight of the modified diene elastomer, of a species star-branched with three branches by a group comprising a silicon atom bearing another function, the other function is a tertiary amine, more particularly a diethylamino- or dimethylamino-group, the other function is bonded to the silicon atom by a spacer group defined as a linear divalent hydrocarbon-based radical, even more preferentially the linear $C_2$ or $C_3$ hydrocarbon-based radical, the alkoxysilane function is a methoxysilane or an ethoxysilane, which is optionally partially or totally hydrolysed to silanol, the diene elastomer is a butadiene polymer, more particularly a butadiene homopolymer or a butadiene/styrene copolymer.

According to this implementation, the modified diene elastomer preferably has the following features:

the alkoxysilane group bears a tertiary amine function, more particularly a diethylamino- or dimethylamino-group, the star-branched diene elastomer comprises a silicon atom bearing a tertiary amine function, more particularly a diethylamino- or dimethylamino-group, the spacer group is a linear $C_3$ hydrocarbon-based radical, the alkoxysilane group is a methoxysilane or ethoxysilane, which is optionally partially or totally hydrolysed to silanol, the diene elastomer is a butadiene/styrene copolymer, the modified diene elastomer comprises at least 75% by weight of the linear diene elastomer functionalized predominantly in the chain middle, the modified diene elastomer comprises at least 5% by weight and at most 25% by weight of the star-branched diene elastomer, relative to the total weight of the modified diene elastomer.

The modified diene elastomer according to the invention can be contained by means of a process as described below.

The first step of a process for producing the modified diene elastomer is the anionic polymerization of at least one conjugated diene monomer or the polymerization of at least one conjugated diene monomer and a vinylaromatic monomer, in the presence of a polymerization initiator.

The monomers are as described above.

As polymerization initiator, use may be made of any known monofunctional anionic initiator. However, an initiator containing an alkaline metal such as lithium is preferentially used.

Organolithium initiators that are suitable are in particular those comprising a carbon-lithium bond. Representative compounds are aliphatic organolithium compounds such as ethyllithium, n-butyllithium (n-BuLi), isobutyllithium, etc.

According to the implementation of the invention according to which the other function is directly bonded to the chain of the elastomer, said function may be introduced by the polymerization initiator. Such initiators are for example polymerization initiators comprising an amine function which produce living chains having an amine group at the nonreactive end of the chain.

By way of polymerization initiators comprising an amine function, mention may preferably be made of lithium amides, produced from the reaction of an organolithium compound, preferably an alkyllithium compound, and of a non-cyclic or cyclic, preferably cyclic, secondary amine.

By way of secondary amine that can be used to produce the initiators, mention may be made of dimethylamine, diethylamine, dipropylamine, di-n-butylamine, di-sec-butylamine, dipentylamine, dihexylamine, di-n-octylamine, di-(2-ethylhexyl)amine, dicyclohexylamine, N-methylbenzylamine, diallylamine, morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5,5]undecane, 3-azabicyclo[3.2.2]nonane, carbazole, bistrimethylsilylamine, pyrrolidine and hexamethyleneamine. The secondary amine, when it is cyclic, is preferably selected from pyrrolidine and hexamethyleneamine.

The alkyllithium compound is preferably ethyllithium, n-butyllithium (n-BuLi), isobutyllithium, etc.

The polymerization is preferably carried out in the presence of an inert hydrocarbon-based solvent which may be, for example, an aliphatic or alicyclic hydrocarbon such as pentane, hexane, heptane, isooctane, cyclohexane, methylcyclohexane or an aromatic hydrocarbon such as benzene, toluene, xylene.

The polymerization can be carried out continuously or batchwise. The continuous polymerization can be carried out in a known manner in one or more supposedly perfectly stirred reactors by those skilled in the art. In the case of polymerization in several reactors, the number of reactors generally varies from 2 to 15 and preferably from 2 to 9.

The polymerization is generally carried out at a temperature ranging from 20° C. to 150° C. and preferably from 30° C. to 120° C.

According to one implementation of the continuous process, the polymerization may be advantageously carried out in several reactors while controlling and equilibrating the conversion in each reactor. For example, the maintaining, in each reactor, of an individual degree of conversion in a range of values which depends on the theoretical individual degree of conversion, calculated from the overall degree of conversion at the polymerization outlet, divided by the number of reactors, can contribute to the obtaining of a polydispersity index reduced by at most 1.6 and at least 1.1. Preferably therefore, the individual degree of conversion can vary by plus or minus 20% of the overall conversion relative to this theoretical value. Such a process is for example described in documents WO 2017/001684 and WO 2017/001637.

It is known that the conversion in each reactor is in particular controlled by the temperature, the residence time, the amount of polar agent and the amount of monomer entering each reactor.

The equilibration of the conversions in each reactor, as previously indicated, makes it possible to minimize the polydispersity index.

According to one implementation of the process in continuous mode, the polymerization in several reactors in series can advantageously be performed by carrying out a temperature gradient in the temperature range indicated above, such that the temperature in each reactor is greater than or equal to the temperature of the reactor which immediately precedes it, the temperature of the final reactor being strictly higher than the temperature of the first reactor.

These implementations of the process of continuous polymerization in several reactors can be combined with one another.

The microstructure of the elastomer can be determined by the presence or absence of a modifying and/or randomizing agent and the amounts of modified and/or randomizing agent employed. Preferentially, when the diene elastomer is based on a diene and a vinylaromatic, a polar agent is used during the polymerization step in amounts such that it promotes the statistical distribution of the vinylaromatic along the polymer chains.

Advantageously, the living diene elastomer resulting from the polymerization is then functionalized by means of a functionalization agent capable of introducing an alkoxysilane group into the polymer structure for producing the modifying diene elastomer according to the invention.

According to one possible variant of production of the modified diene elastomer according to the invention, the reaction for modifying the living diene elastomer, obtained at the end of the first step, can be carried out at a temperature of between −20° C. and 100° C., by addition to the living polymer chains or conversely of a non-polymerizable functionalization agent capable of forming an alkoxysilane group, the silicon atom, which integrates into the elastomer chain, optionally bearing a function. The functionalization agents bear functions that are reactive with respect to the living elastomer.

Thus, according to one preferred variant of the process for synthesizing the modified diene elastomer of the invention, the functionalization agent corresponds to the formula:

$$(Y)_d Si(R)_e X$$

in which,

Y represents a function that is reactive with respect to the living elastomer, selected from halogen atoms, preferably the chlorine atom, alkoxy radicals which are optionally partially or totally hydrolysable, of formula —OR', R' representing an alkyl radical, the alkyl radicals, which are substituted or unsubstituted, being $C_1$-$C_{10}$, or even $C_1$-$C_8$, preferably a $C_1$-$C_4$ alkyl group, more preferentially a methyl or ethyl group;

the R radicals, which may be identical or different, represent substituted or unsubstituted, $C_1$-$C_{10}$, or even $C_1$-$C_8$, alkyl radicals, preferably a $C_1$-$C_4$ alkyl group, more preferentially a methyl or ethyl group;

X represents a group comprising another function;

d is 1, 2 or 3, e is 0, 1 or 2, with the proviso that d+e=3.

The other function is as defined above.

According to one variant of the invention, the other function is a protected or non-protected primary amine, a protected or non-protected secondary amine, or a tertiary amine. The nitrogen atom may then be substituted with two groups, which may be identical or different, possibly being a trialkylsilyl radical, the alkyl group having 1 to 4 carbon atoms, or a $C_1$-$C_{10}$ alkyl radical, preferably $C_1$-$C_4$ alkyl radical, more preferentially a methyl or ethyl radical, or else the two substituents of the nitrogen form, with said nitrogen, a heterocycle containing a nitrogen atom and at least one carbon atom, preferably from 2 to 6 carbon atoms.

By way of functionalization agent, mention may be made, for example of (N,N-dialkylaminoalkyl)trialkoxysilanes, (N-alkylaminoalkyl)trialkoxysilanes of which the secondary amine function is protected with a trialkylsilyl group, and (aminoalkyl)trialkoxysilanes of which the primary amine function is protected with two trialkylsilyl groups, the alkyl group making it possible to bond the amine function to the trialkoxysilyl group is the spacer group as described above, which is preferentially a $C_2$ or $C_3$ group.

The functionalization agent may be selected from 3-(N,N-dimethyl-aminopropyl)trimethoxysilane, 3-(N,N-dimethylaminopropyl)triethoxysilane, 3-(N,N-diethylaminopropyl)trimethoxysilane, 3-(N,N-diethylaminopropyl)triethoxysilane, 3-(N,N-dipropylaminopropyl)trimethoxysilane, 3-(N,N-dipropylamino-propyl)triethoxysilane, 3-(N,N-dibutylaminopropyl)trimethoxysilane, 3-(N,N-dibutyl-aminopropyl)triethoxysilane, 3-(N,N-dipentylaminopropyl)trimethoxysilane, 3-(N,N-dipentylaminopropyl)triethoxysilane, 3-(N,N-dihexylaminopropyl)trimethoxysilane, 3-(N,N-dihexylaminopropyl)triethoxysilane, 3-(hexamethyleneamino-propyl)trimethoxysilane, 3-(hexamethyleneaminopropyl)triethoxysilane, 3-(morpho-linopropyl)trimethoxysilane, 3-(morpholinopropyl)triethoxysilane, 3-(piperidino-propyl)trimethoxysilane and 3-(piperidinopropyl)triethoxysilane. More preferentially, the functionalization agent is 3-(N,N-dimethylaminopropyl)trimethoxysilane.

The functionalization agent may be selected from 3-(N,N-methyltrimethylsilylaminopropyl)trimethoxysilane, 3-(N,N-methyltrimethylsilylamino-propyl)triethoxysilane, 3-(N,N-ethyltrimethylsilylaminopropyl)trimethoxysilane, 3-(N,N-ethyltrimethylsilylaminopropyl)triethoxysilane, 3-(N,N-propyltrimethyl-silylaminopropyl)trimethoxysilane and 3-(N,N-propyltrimethylsilylaminopropyl)triethoxysilane. More preferentially, the functionalization agent is 3-(N,N-meth-yltrimethylsilylaminopropyl)trimethoxysilane.

The functionalization agent may be selected from 3-(N,N-bistrimethyl-silylaminopropyl)trimethoxysilane and 3-(N,N-bistrimethylsilylamino-propyl)triethoxysilane. More preferentially, the functionalization agent is 3-(N,N-bis-trimethylsilylaminopropyl)trimethoxysilane.

According to one advantageous variant of the invention, the functionalization agent is selected from (N,N-dialkylaminoalkyl)trialkoxysilanes; more particularly then the functionalization agent is 3-(N,N-dimethylaminopropyl)trimethoxysilane.

The function capable of interacting with a reinforcing filler may also be an imine function. Preferentially then, the functionalization agent is selected from N-(1,3-dimethylbutylidene)-3-(trimethoxysilyl)-1-propanamine, N-(1,3-dimethylbutylidene)-3-(triethoxysilyl)-1-propanamine, N-(1,3-methylethylidene)-3-(trimethoxysilyl)-1-propanamine, N-(1,3-methylethylidene)-3-(triethoxysilyl)-1-propanamine, N-ethylidene-3-(trimethoxysilyl)-1-propanamine, N-ethylidene-3-(triethoxysilyl)-1-propanamine, N-(1-methylpropylidene)-3-(trimethoxysilyl)-1-propanamine, N-(1-methylpropylidene)-3-(triethoxysilyl)-1-propanamine, N-(4-N,N-dimethylaminobenzylidene)-3-(trimethoxysilyl)-1-propanamine, N-(4-N,N-dimethyl-aminobenzylidene)-3-(triethoxysilyl)-1-propanamine, N-(cyclohexylidene)-3-(trimethoxysilyl)-1-propanamine, N-(cyclohexylidene)-3-(triethoxysilyl)-1-propanamine, N-(3-trimethoxysilylpropyl)-4,5-dihydroimidazole, N-(3-triethoxy-silylpropyl)-4,5-dihydroimidazole, N-(3-trimethoxysilylpropyl)-4,5-imidazole and N-(3-triethoxysilylpropyl)-4,5-imidazole.

The function capable of interacting with a reinforcing filler may also be a cyano function. Preferentially then, the functionalization agent is selected from 3-(cyanopropyl)trimethoxysilane and 3-(cyanopropyl)triethoxysilane.

The function capable of interacting with a reinforcing filler may also be a protected or non-protected thiol function. By way of example, mention may be made of (S-trialkylsilylmercaptoalkyl)trialkoxysilanes. Preferentially then, the functionalization agent is selected from (S-trimethylsilylmercaptopropyl)trimethoxysilane, (S-trimethylsilylmercaptopropyl)triethoxysilane, (S-tert-butyl-dimethylsilylmercaptopropyl)trimethoxysilane, (S-tert-butyldimethylsilylmercapto-propyl)triethoxysilane, (S-trimethylsilylmercaptoethyl)trimethoxysilane, (S-trimethylsilylmercaptoethyl)triethoxysilane, (S-tert-butyldimethylsilylmercapto-ethyl)trimethoxysilane and (S-tert-butyldimethylsilylmercaptoethyl)triethoxysilane.

The function capable of interacting with a reinforcing filler may also be a carboxylate function. By way of carboxylate function, mention may be made of acrylates or methacrylates. Such a function is preferably a methacrylate. Preferentially then, the functionalization agent is selected from 3-(methacryloyloxypropyl)trimethoxysilane and 3-(methacryloyloxypropyl)triethoxysilane.

The function capable of interacting with a reinforcing filler may also be an epoxide function. Preferentially then, the functionalization agent is selected from 2-(glycidyloxyethyl)trimethoxysilane, 2-(glycidyloxyethyl)triethoxysilane, 3-(glycidyl-oxypropyl)trimethoxysilane, 3-(glycidyloxypropyl)triethoxysilane, 2-(3,4-epoxycyclohexyl)ethyltrimethoxysilane and 2-(3,4-epoxycyclohexyl)ethyltriethoxy-silane.

The function capable of interacting with a reinforcing filler may also be a protected or non-protected primary, protected or non-protected secondary, or tertiary phosphine function. Preferentially then, the functionalization agent is selected from 3-(P,P-bistrimethylsilylphosphinopropyl)trimethoxysilane, 3-(P,P-bistrimethyl-silylphosphinopropyl)triethoxysilane, 3-(methyltrimethylsilylphosphinopropyl)trimethoxysilane, 3-(methyltrimethylsilylphosphinopropyl)triethoxysilane, 3-(ethyl-trimethylsilylphosphinopropyl)trimethoxysilane, 3-(ethyltrimethylsilylphosphinoprop-yl)triethoxysilane, 3-(dimethylphosphinopropyl)trimethoxysilane, 3-(dimethyl-pho sphinopropyl)

triethoxysilane, 3-(diethylpho sphinopropyl)trimethoxysilane, 3-(diethylphosphinopropyl)triethoxysilane, 3-(ethylmethylphosphinopropyl)trimethoxysilane, 3-(ethylmethylphosphinopropyl)triethoxysilane, 3-(diphenylphosphinopropyl)trimethoxysilane and 3-(diphenylphosphinopropyl) triethoxysilane.

It should be specified that it is known to those skilled in the art that, when an elastomer is modified by reacting a functionalization agent on the living elastomer resulting from an anionic polymerization step, a mixture of modified species of this elastomer, the composition of which depends in particular on the proportion of reactive sites of the functionalization agent relative to the number of living elastomer chains, is obtained. This mixture comprises chain-end-functionalized, coupled, star-branched and/or non-functionalized species.

The molar ratio of the functionalization agent to the metal of the polymerization initiator depends essentially on the type of modified diene elastomer desired. Thus, with a ratio ranging from 0.40 to 0.75, or even from 0.45 to 0.65, or else from 0.45 to 0.55, the formation of species coupled within the modified elastomer is promoted, the silyl group then being located in the chain middle. Likewise, with a ratio ranging from 0.15 to 0.40, or even from 0.20 to 0.35, or else from 0.30 to 0.35, predominantly star-branched species (3 branches) are formed within the modified elastomer. With a ratio greater than or equal to 0.75, or even greater than 1, chain-end-functionalized species are predominantly formed.

According to one particularly preferred implementation of the invention, the molar ratio between the functionalization agent and the polymerization initiator ranges from 0.35 to 0.65, preferentially from 0.40 to 0.60 and even more preferentially from 0.45 to 0.55.

According to one variant of production of the modified diene elastomer of the invention, the living elastomer resulting from the anionic polymerization step can, for example, prior to the functionalization step, be subjected to a star-branching step by reaction with a star-branching agent. The star-branching agents are preferentially agents based on tin or on silicon with a functionality greater than 2. Such star-branching agents are known to those skilled in the art. They comprise not only trihalogenated compounds of tin and of silicon, such as $SnR_1X'_3$, $SnHX'_3$, $SiR_1X'_3$ or $SiHX'_3$, but also $SnX'_4$, $SiX'_4$, or even also trialkoxysilanes optionally substituted with a function. In these formulae, $R_1$ is an alkyl or aralkyl group having from 1 to 20 carbon atoms and X' is a halogen.

According to one particularly advantageous method of producing the modified diene elastomer according to the invention, the functionalization agent and the star-branching agent are one and the same compound. In this production method, the functionalization can then advantageously be carried out continuously and in particular according to the procedures described in application WO 2015/018599 A1.

According to another method of producing the modified diene elastomer according to the invention, the functionalization agent and the star-branching agent are distinct. According to this particular embodiment, the star-branching of the living diene elastomer resulting from the polymerization step can be carried out, in a first step, at a temperature ranging from 20 to 120° C. Then, in a second step, the remaining living chains of the diene elastomer obtained after the first step are functionalized by addition of a functionalization agent capable of introducing, within the structure of the elastomer, the alkoxysilane group optionally bearing another function.

According to the variants of the invention, according to which the functionalization agent bears a protected primary amine or protected secondary amine function, the synthesis process can be continued by means of a step of deprotecting the primary or secondary amine. This step is carried out after the modification reaction. By way of example, the chains functionalized by the protected amine group can be reacted with an acid, a base or a fluorinated derivative such as tetrabutylammonium fluoride, a silver salt such as silver nitrate, etc., in order to deprotect this amine function. These various methods are described in the handbook "Protective Groups in Organic Synthesis, T. W. Green, P. G. M. Wuts, Third Edition, 1999". This deprotection step can have the effect of hydrolysing all or some of the hydrolysable alkoxysilane functions of the modified diene elastomer so as to convert them into silanol functions.

According to the variants of the invention, according to which the functionalization agent bears a protected thiol function, the synthesis process can be continued by means of a thiol-deprotecting step. This step is carried out after the modification reaction. By way of example, the chains functionalized by the protected thiol group can be reacted with water, an alcohol or an acid (hydrochloric acid, sulfuric acid, carboxylic acid). This deprotection step can have the effect of hydrolysing all or some of the hydrolysable alkoxysilane functions of the modified diene elastomer so as to convert them into silanol functions.

According to the variants of the invention, according to which the functionalization agent bears a protected primary or secondary phosphine function, the synthesis process can be continued by means of a phosphine-deprotecting step. This step is carried out after the modification reaction. By way of example, the chains functionalized by the protected phosphine group can be reacted with water, an alcohol or an acid (hydrochloric acid, sulfuric acid, carboxylic acid). This deprotection step can have the effect of hydrolysing all or some of the hydrolysable alkoxysilane functions of the modified diene elastomer so as to convert them into silanol functions.

According to variants of the invention, the synthesis process can comprise a step of hydrolysing the hydrolysable alkoxysilane functions, by addition of an acid, basic or neutral compound as described in document EP 2 266 819 A1. The hydrolysable functions are then totally or partially converted into silanol functions. At least 50 mol %, or even at least 80 mol % and up to 100 mol % of the functions can thus be hydrolysed.

The process for synthesizing the modified diene elastomer according to the invention can be continued in a manner known per se by means of steps of recovering the modified elastomer.

According to variants of this process, these steps comprise a stripping step with a view to recovering the elastomer, resulting from the prior steps, in dry form. This stripping step can have the effect of hydrolysing all or some of the hydrolysable alkoxysilane functions of the modified diene elastomer so as to convert them into silanol functions. Advantageously, at least 50 mol % of the functions can thus be hydrolysed.

Those skilled in the art will understand that these steps can be combined with one another provided that they are compatible. Thus, the process for synthesizing the modified diene elastomer according to the invention can comprise all or some of these deprotecting, specific hydrolysis and stripping steps which follow the modification step.

According to the invention, the modified diene elastomer can be, according to different variants, used alone in the composition or as a mixture with at least one other conventional diene elastomer, whether it is star-branched, coupled, functionalized or non-functionalized. Preferentially, this other diene elastomer used in the invention is selected from the group of diene elastomers consisting of polybutadienes (BRs), synthetic polyisoprenes (IRs), natural rubber (NR), butadiene copolymers, isoprene copolymers and the mixtures of these elastomers. Such copolymers are more preferentially selected from the group consisting of butadiene/styrene copolymers (SBR), butadiene/ethylene copolymers, isoprene/butadiene copolymers (BIR), isoprene/styrene copolymers (SIR) and isoprene/butadiene/styrene copolymers (SBIR). It is also possible to envisage a mixture with any synthetic elastomer other than a diene elastomer, or even with any polymer other than an elastomer, for example a thermoplastic polymer.

When the conventional elastomer used as a mixture is natural rubber and/or one or more diene polymers such as, for example, polybutadienes, polyisoprenes, or butadiene/styrene or butadiene/styrene/soprene copolymers, this or these modified or non-modified elastomer(s) may then be present at from 1 to 70 parts by weight per 100 parts of modified diene elastomer according to the invention, preferentially from 1 to 40 parts per 100 parts of modified diene elastomer according to the invention.

It will be noted that the lower the proportion of the different elastomer(s) of the modified diene elastomers of the invention in this composition, the greater the improvement in the properties of the composition according to the invention.

Thus, preferably, the elastomer matrix comprises predominantly by weight the modified diene elastomer according to the invention. More preferably, the elastomer matrix consists solely of the modified diene elastomer according to the invention.

The rubber composition of the invention comprises, in addition to at least an elastomer matrix as described above, at least a reinforcing filler.

Use may be made of any type of reinforcing filler known for its abilities to reinforce a rubber composition that can be used for the manufacture of tire treads, for example carbon black, a reinforcing inorganic filler such as silica, with which is combined in a known manner a coupling agent, or else a mixture of these two types of filler.

The term "reinforcing inorganic filler" should be understood to mean in the present application, by definition, any inorganic or mineral filler regardless of its colour and its origin (natural or synthetic), capable of reinforcing by itself, without any means other than an intermediate coupling agent, a rubber composition intended for the manufacture of tires; such a filler is generally characterized, in the known manner, by the presence of hydroxyl (—OH) groups at its surface.

As suitable reinforcing inorganic fillers there are in particular mineral fillers of the siliceous type, in particular silica ($SiO_2$), or of the aluminous type, in particular alumina ($Al_2O_3$). The silica used can be any reinforcing silica known to those skilled in the art, in particular any precipitated or fumed silica having a BET surface area and also a CTAB specific surface area which are both less than 450 m$^2$/g, preferably from 30 to 400 m$^2$/g, in particular between 60 and 300 m$^2$/g, even more preferentially between 130 and 300 m$^2$/g, or even between 130 and 250 m$^2$/g. Mention will also be made of mineral fillers of the aluminous type, in particular alumina ($Al_2O_3$) or aluminium (oxide) hydroxides, or else reinforcing titanium oxides, for example described in U.S. Pat. Nos. 6,610,261 and 6,747,087. As suitable reinforcing fillers there are also reinforcing fillers of another nature, in particular carbon black, provided that these reinforcing fillers are covered with a siliceous layer, or else comprise, at their surface, functional sites, in particular hydroxyl functional sites, requiring the use of a coupling agent in order to establish the bond between the filler and the elastomer. By way of example, mention may for example be made of carbon blacks for tires as described for example in patent documents WO 96/37547 and WO 99/28380.

The physical state in which the reinforcing inorganic filler is provided is of no importance, whether it is in powder, microbead, granule or ball form or any other appropriate densified form. Of course, the term "reinforcing inorganic filler" is also intended to mean mixtures of various reinforcing fillers, in particular of highly dispersible siliceous fillers.

Preferentially, the content of total reinforcing filler (carbon black and/or other reinforcing filler) is between 10 and 200 phr, more preferentially between 30 and 155 phr, and even more preferentially between 50 and 155 phr, the optimum being, as is known, different depending on the particular applications targeted. According to certain variants of the invention, the content of total reinforcing filler is between 60 and 125 phr. According to other variants of the invention, the content of total reinforcing filler is between 50 and 95 phr.

According to one variant of the invention, the reinforcing filler is predominantly other than carbon black, that is to say that it comprises more than 50% by weight, of the total weight of the reinforcing filler, of one or more fillers other than carbon black, in particular a reinforcing inorganic filler such as silica, or even it consists exclusively of such a filler.

According to this variant, when carbon black is also present, it can be used in a content of less than 20 phr, more preferentially less than 10 phr (for example between 0.5 and 20 phr, in particular from 1 to 10 phr). Carbon blacks that are then suitable are carbon blacks that are used individually or in the form of mixtures, in particular the blacks of the HAF, ISAF, SAF type conventionally used in tire treads (termed tire-grade blacks). Among the latter, mention will more particularly be made of the reinforcing carbon blacks of the 100, 200 or 300 series (ASTM grades), for instance the blacks N115, N134, N234, N326, N330, N339, N347, N375.

When the reinforcing filler comprises a filler that requires the use of a coupling agent in order to establish the bond between the filler and the elastomer, the rubber composition according to the invention also comprises, conventionally, an agent capable of effectively ensuring this bond. When silica is present in the composition as a reinforcing filler, use may be made, as coupling agents, of organosilanes, in particular polysulfide alkoxysilanes or mercaptosilanes, or else polyorganosiloxanes which are at least bifunctional. These compounds are well known to those skilled in the art.

Such a coupling agent should not be confused with the agent capable of coupling the diene elastomer and used for the synthesis of the modified diene elastomer described above.

In the composition according to the invention, the content of coupling agent is advantageously less than 20 phr, it being understood that it is generally desirable to use the smallest possible amount thereof. Its content is preferentially between 0.5 and 12 phr. The presence of the coupling agent depends on that of the reinforcing inorganic filler. Its content is easily adjusted by those skilled in the art according to the content of this filler; it is typically about 0.5% to 15% by weight relative to the amount of reinforcing inorganic filler.

The rubber composition according to the invention can also contain, in addition to the coupling agents, coupling activators, agents for covering the fillers or more generally processing aids capable, in a known manner, by virtue of an improvement in the dispersion of the filler in the rubber matrix, and of a decrease in the viscosity of the composition, of improving the ease with which it can be processed in the raw state, these agents being for example hydrolysable silanes such as alkylalkoxysilanes, polyols, polyethers, primary, secondary or tertiary amines, or hydroxylated or hydrolysable polyorganosiloxanes.

The rubber compositions in accordance with the invention can also contain reinforcing organic fillers that can replace all or some of the carbon blacks or of the other reinforcing inorganic fillers described above. As examples of reinforcing organic fillers, mention may be made of the functionalized-polyvinyl organic fillers as described in applications WO-A-2006/069792, WO-A-2006/069793, WO-A-2008/003434 and WO-A-2008/003435.

The rubber composition according to the invention also comprises a crosslinking system based either on sulfur, or on sulfur donors and/or on peroxide and/or on bismaleimides. The crosslinking system can also comprise vulcanization accelerators or vulcanization activators.

The rubber composition according to the invention also comprises a plasticizing system. According to the invention, the term "plasticizing system" is intended to mean one or more plasticizers selected from liquid plasticizers and solid plasticizers.

A solid plasticizer is a hydrocarbon-based resin, the Tg of which is greater than 0° C., preferably greater than +20° C.

In a manner known to those skilled in the art, the name "resin" is reserved in the present application, by definition, for a thermoplastic compound which is a solid at ambient temperature (23° C.), as opposed to a liquid plasticizing compound such as an oil.

The hydrocarbon-based resins are polymers well known to those skilled in the art, essentially based on carbon and hydrogen, but which can comprise other types of atoms, that can be used in particular as plasticizing agents or tackifying agents in polymeric matrices. They are by nature at least partially, at the contents used, miscible (i.e. compatible) with the polymer compositions for which they are intended, in such a way as to act as true diluents. They have been described for example in the book entitled "Hydrocarbon Resins" by R. Mildenberg, M. Zander and G. Collin (New York, V C H, 1997, ISBN 3-527-28617-9) chapter 5 of which is devoted to the applications thereof, in particular in the tire rubber field (5.5. "Rubber Tires and Mechanical Goods"). They may be aliphatic, cycloaliphatic, aromatic, hydrogenated aromatic, or of the aliphatic/aromatic type, that is to say based on aliphatic and/or aromatic monomers. They may be natural or synthetic, and may or may not be petroleum-based (if such is the case, they are also known as petroleum resins). Their Tg is preferably greater than 0° C., in particular greater than 20° C. (usually between 30° C. and 95° C.).

A liquid plasticizer is a plasticizing agent which is liquid (at 23° C.) and the function of which is to soften the matrix by diluting the elastomer and the reinforcing filler; its Tg is preferentially less than −20° C., more preferentially less than −40° C.

Any extender oil, whether it is of aromatic or non-aromatic nature, or any liquid plasticizing agent known for its plasticizing properties with respect to diene elastomers, can be used. At ambient temperature (23° C.), these plasticizers or these oils, which are more or less viscous, are liquids (that is to say, as a reminder, substances having the capacity to in the end take on the shape of their container), as opposed in particular to hydrocarbon-based plasticizing resins which are by nature solid at ambient temperature.

Particularly suitable are liquid plasticizing agents selected from the group consisting of liquid diene polymers, polyolefin oils, naphthenic oils, paraffinic oils, DAE oils, MES (Medium Extracted Solvate) oils, TDAE (Treated Distillate Aromatic Extract) oils, RAE oils (Residual Aromatic Extract oils), TRAE (Treated Residual Aromatic Extract) oils and SRAE oils (Safety Residual Aromatic Extract oils), mineral oils, vegetable oils, ether plasticizers, ester plasticizers, phosphate plasticizers, sulfonate plasticizers and mixtures of these compounds. According to one more preferential embodiment, the liquid plasticizing agent is selected from the group consisting of MEMS oils, TDAE oils, naphthenic oils, vegetable oils and mixtures of these oils.

The content of plasticizing system is preferentially between 0 and 200 phr, more preferentially in a range from 10 to 150 phr, even more preferentially between 20 and 100 phr.

The rubber composition according to the invention may also comprise all or some of the usual additives normally used in elastomer compositions intended for the manufacture of tires, for instance pigments, non-reinforcing fillers, protective agents such as anti-ozone waxes, chemical anti-ozonants, antioxidants, anti-fatigue agents, liquid plasticizing agents such as oils, reinforcing resins, acceptors (for example novolac phenolic resin) or donors of methylene (for example HMT or H3M) as described for example in application WO 02/10269.

The composition is manufactured in suitable mixers, using two successive preparation phases well known to those skilled in the art: a first phase of thermomechanical working or kneading (referred to as a "non-productive" phase) at high temperature, up to a maximum temperature of between 110° C. and 190° C., preferably between 130° C. and 180° C., followed by a second phase of mechanical working (referred to as a "productive" phase) to a lower temperature, typically less than 110° C., for example between 40° C. and 100° C., during which finishing phase the crosslinking system is incorporated.

The process for producing a composition according to the invention generally comprises:
(i) carrying out, at a maximum temperature of between 130° C. and 180° C., a first step of thermomechanical working of the constituents of the composition comprising the modified diene elastomer according to the invention and a reinforcing filler, with the exception of a crosslinking system, then
(ii) carrying out, at a temperature below said maximum temperature of said first step, a second step of mechanical working during which said crosslinking system is incorporated.

This process may also comprise, prior to carrying out the abovementioned steps (i) and (ii), the steps of producing the modified diene elastomer according to the process described above.

A subject of the invention is also a semi-finished rubber article for tires, comprising a crosslinkable or crosslinked rubber composition according to the invention, or consisting of such a composition.

The final composition thus obtained can subsequently be calendered, for example in the form of a sheet or slab, or else extruded, for example to form a rubber profiled element that can be used as a semi-finished rubber product intended for tires.

The reinforced rubber composition according to the invention can be in the crosslinked state or in the non-crosslinked state, in other words crosslinkable state.

Because of the improvement in the hysteresis properties which characterizes a reinforced rubber composition according to the invention, it will be noted that such a composition can constitute any semi-finished product of the tire and most particularly the tread, reducing in particular its rolling resistance.

Finally, a subject of the invention is thus a tire comprising a semi-finished article according to the invention, in particular a tread.

The abovementioned features of the present invention, and also others, will be understood more clearly on reading the following description of several exemplary embodiments of the invention, which are given by way of illustration and are non-limiting.

EXAMPLES

Measurements and Tests Used
Size Exclusion Chromatography

The SEC (Size Exclusion Chromatography) technique makes it possible to separate macromolecules in solution according to their size through columns filled with a porous gel. The macromolecules are separated according to their hydrodynamic volume, those with the greatest volume being eluted first.

Without being an absolute method, SEC makes it possible to learn the distribution of the molar masses of a polymer. On the basis of commercial standard products, the various number-average (Mn) and weight-average (Mw) molar masses can be determined and the polydispersity index (PI=Mw/Mn) can be calculated via a "Moore" calibration. A calibration curve linking the logarithm of the molar mass (log M) to the elution time (te) is produced beforehand with standards, and modelled.

For elastomers, there is no particular treatment of the polymer sample before analysis. Said sample is simply dissolved in the elution solvent at a concentration of approximately 1 g·l$^{-1}$. The solution is then filtered through a filter with a porosity of 0.45 μm, before injection.

The apparatus used is a "Waters Alliance" chromatography system. The elution solvent is either tetrahydrofuran, or tetrahydrofuran+1 vol. % of diisopropylamine+1 vol. % of triethylamine, the flow rate is 1 ml·min$^{-1}$, the temperature of the system is 35° C. and the analysis time is 30 min. A set of two Waters columns having the tradename "Styragel HT6E" is used. The injected volume of the solution of the polymer sample is 100 μl. The detector is a "Waters 2410" differential refractometer and the chromatographic data exploitation software is the "Waters Empower" system.

The calculated average molar masses are relative to a calibration curve produced for SBRs having the following microstructure: 25% by weight (relative to the weight of the polymer) of styrene-type units, 23% by weight (relative to the butadiene portion) of units of 1,2 type and 50% by weight (relative to the butadiene portion) of units of 1,4-trans type.

Mooney Viscosity

For the polymers and the rubber compositions, the Mooney ML(1+4)100° C. viscosities are measured according to ASTM Standard D-1646.

An oscillating consistometer is used as described in ASTM Standard D-1646. The Mooney plasticity measurement is carried out according to the following principle: The elastomer or the composition in the raw state (i.e. before curing) is moulded in a cylindrical chamber heated to 100° C. After preheating for one minute, the rotor rotates within the test specimen at 2 rpm and the working torque for maintaining this movement is measured after 4 minutes in rotation. The Mooney plasticity ML(1+4) is expressed in "Mooney units" (MU, with 1 MU=0.83 N·m).

The difference between the Mooney viscosity of the composition and the Mooney viscosity of the elastomer makes it possible to measure the raw processability. The lower this difference, the better the raw processing.

Differential Scanning Calorimetry

The glass transition temperatures (Tg) of the elastomers are determined using a differential scanning calorimeter, according to ASTM Standard E1356-08 (2014).

Near Infrared Spectroscopy (NIR)

The microstructure of the elastomers is characterized using the Near Infrared Spectroscopy (NIR) technique.

Near Infrared Spectroscopy (NIR) is used to quantitatively determine the weight content of styrene in the elastomer and also the microstructure thereof (relative distribution of the 1,2, 1,4-trans and 1,4-cis butadiene units). The principle of the method is based on the Beer-Lambert law generalized to a multicomponent system. Since the method is indirect, it uses multivaried calibration [Vilmin, F.; Dussap, C.; Coste, N. Applied Spectroscopy 2006, 60, 619-29] carried out by means of standard elastomers having a composition determined by $^{13}$C NMR. The styrene content and the microstructure are then calculated from the NIR spectrum of an elastomer film approximately 730 μm thick. The acquisition of the spectrum is carried out in transmission mode between 4000 and 6200 cm$^{-1}$ with a resolution of 2 cm$^{-1}$, using a Bruker Tensor 37 Fourier transform near infrared spectrometer equipped with an InGaAs detector cooled by Peltier effect.

Dynamic Properties

The dynamic properties, and in particular tan δ max, are measured on a visco analyser (Metravib VA4000) according to ASTM Standard D 5992-96. The response of a sample of vulcanized composition (cylindrical test specimen with a thickness of 2 mm and a cross section of 79 mm$^2$), subjected to a simple alternating sinusoidal shear stress, at a frequency of 10 Hz, under standard temperature conditions (23° C.) according to ASTM Standard D 1349-99, is recorded. A strain amplitude sweep is carried out from 0.1% to 50% peak-to-peak (outward cycle) and then from 50% to 0.1% peak-to-peak (return cycle). The result more particularly made use of is the loss factor tan δ. For the return cycle, the maximum value of tan δ observed, denoted tan δ max, is indicated. This value is representative of the hysteresis of the material and, in the present case, of the rolling resistance: the lower the value of tan δ max, the lower the rolling resistance. In the examples, the results of the dynamic properties are given in base 100. The higher this number, the higher the hysteresis.

Synthesis of the Modified Diene Elastomers

The modified diene elastomers are synthesized according to the process below.

Continuously introduced into one or two stirred, supposedly perfectly stirred, continuously-fed reactor(s) according to those skilled in the art are methylcyclohexane, butadiene, styrene and tetrahydrofurfuryl ethyl ether, according to the proportions reported in the following table. n-Butyllithium (n-BuLi) is introduced in sufficient amounts in order to neutralize the protic impurities introduced by the various constituents present, into the inlet of the first reactor. The amount in mol of n-BuLi per 100 g of monomer introduced at the inlet of the reactor or of the first reactor is reported in the table.

A sample of polymer solution is taken at the outlet of the polymerization reactor or of the second polymerization reactor, as appropriate. The polymer thus obtained is subjected to an anti-oxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is then separated from its solution by a steam stripping operation, then dried on an open mill at 100° C.

At the outlet of the polymerization reactor or of the second polymerization reactor, as appropriate, 3-(N,N-dimethylaminopropyl)trimethoxysilane (coupling and star-branching agent AdC) in solution in methylcyclohexane is added to the living polymer solution according to the proportions reported in the following table, making it possible to obtain a functionalization agent to polymerization initiator ratio of 0.52.

|  | Polymers | | | | | |
| --- | --- | --- | --- | --- | --- | --- |
|  | A | B | C | D | E | F |
| Weight % styrene | 30 | 33 | 19 | 19 | 3 | 3.5 |
| Weight % butadiene | 70 | 66 | 81 | 81 | 97 | 96.5 |
| Weight concentration of monomer (%) | 11 | 11 | 11 | 11 | 11 | 11 |
| Tetrahydrofurfuryl ethyl ether (ppm) | 60 | 20 | 60 | 20 | 15 | 8 |
| n-BuLi per 100 g of monomer (µmol) | 929 | 807 | 750 | 740 | 720 | 770 |
| Number of reactors in series | 1 | 2 | 1 | 2 | 1 | 2 |
| Temperature reactor(s) (° C.) | 90 | 60/85 | 90 | 60/85 | 95 | 60/95 |
| Functionalization agent per 100 g of monomer (µmol) | 474 | 420 | 390 | 385 | 375 | 400 |

The elastomers thus obtained are subjected to an anti-oxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The elastomers thus treated are then separated from the solution by a steam stripping operation, then dried on an open mill at 100° C.

The modified diene elastomers obtained above have the characteristics reported in the table below.

|  | Polymers | | | | | |
| --- | --- | --- | --- | --- | --- | --- |
|  | A | B | C | D | E | F |
| Tg (° C.) | −47 | −49 | −65 | −65 | −88 | −88 |
| % 1,2/BR | 23.1 | 24.5 | 23.4 | 23 | 12.7 | 13 |
| % Styrene/SBR | 27.7 | 27.5 | 15.2 | 15.1 | 2.1 | 3.5 |
| PI before modification | 1.9 | 1.5 | 1.9 | 1.5 | 1.9 | 1.5 |
| "Initial" inherent viscosity | 1.48 | 1.34 | 1.76 | 1.63 | 1.98 | 1.77 |
| "Final" inherent viscosity | 1.87 | 1.81 | 2.26 | 2.20 | 2.52 | 2.39 |
| "Final" viscosity/"initial" viscosity ratio | 1.26 | 1.35 | 1.28 | 1.35 | 1.27 | 1.35 |
| Coupled content* | 77% | 77% | 78% | 78% | 77% | 80% |
| Star-branched content* | 16% | 13% | 11% | 10% | 14% | 10% |
| Mooney | 56 | 56 | 72 | 70 | 70 | 67 |

*The coupled and star-branched contents are determined according to the methods described in application WO 2017/060395 for the polymers synthesized in 1 reactor and WO 2017/001684 for the polymers synthesized in 2 reactors.

Rubber Compositions:

The elastomers A to F were used for the production of rubber compositions of tread type, each comprising silica as reinforcing filler.

Each of the following compositions is prepared, in a first step, by thermomechanical working, then, in a second finishing step, by mechanical working.

Successively introduced into a "Banbury"-type laboratory internal mixer, the capacity of which is 400 cm$^3$, which is filled to 70% and the initial temperature of which is approximately 90° C., are the elastomer, two-thirds of the silica, the black, the coupling agent and the oil, then, approximately one minute later, the remainder of the reinforcing filler, the resin, the antioxidant, the steric acid and the anti-ozone wax, then, approximately two minutes later, the zinc monoxide.

The thermomechanical working step is carried out for 4 to 5 minutes, until a maximum dropping temperature of approximately 160° C. is reached.

The abovementioned first thermomechanical working step is thus carried out, it being specified that the average speed of the bars during this first step is 50 rpm.

The mixture thus obtained is recovered, it is cooled, and then the sulfur and the accelerator are added, at 30° C., into an external mixer (homogenizer-finisher), while further mixing the whole for a period of 3 to 4 minutes (abovementioned second mechanical working step).

The compositions thus obtained are then calendered, either in the form of blocks (having a thickness ranging from 2 to 3 mm) or thin sheets of rubber, for the measurement of their physical or mechanical properties, or in the form of profiled elements that can be used directly, after cutting up and/or assembly to the desired dimensions, for example as semi-finished products for tires, in particular for treads.

The crosslinking is carried out at 150° C. for 40 min.

Formulations and Measurements

The comparison of the characteristics of the compositions is carried out at identical microstructure and functionalization of the elastomers constituting all or part of the elastomer matrix of these compositions.

Compositions CA and CB

The compositions CA and CB have the following formulations (expressed in phr: parts per hundred parts of elastomer).

|  | CA | CB |
| --- | --- | --- |
| Elastomer A | 100.00 |  |
| Elastomer B |  | 100 |
| CARBON BLACK | 3.00 | 3.00 |
| SILICA | 70 | 70 |
| RESIN | 16.00 | 16.00 |
| ANTIOXIDANT | 2 | 2 |
| SILANE | 5.60 | 5.60 |
| STEARIC ACID | 2.00 | 2.00 |
| DPG | 1.40 | 1.40 |
| ZNO | 0.80 | 0.80 |
| CBS | 1.70 | 1.70 |
| SULFUR | 1.00 | 1.00 |

Carbon black ASTM grade N234 from Cabot Corporation
Z1165MP silica from Rhodia, type HDS
PR-383 resin from ExxonMobil chemicals
Antioxidant: N-(1,3-dimethylbutyl)-N'-phenyl-p-phenylenediamine, from the company Flexsys
TESPT Si69 silane, from Degussa
DPG: Diphenylguanidine ("Perkacit" DPG from the company Flexsys)
CBS: N-cyclohexyl-2-benzothiazole-sulfenamide ("Santocure CBS" from the company Flexsys)

The difference in the tan $\delta_{max,23° C.}$ values between the compositions CA and CB is reported in the table below:

|  | CA | CB |
| --- | --- | --- |
| Tan delta max 23° C. in base 100 | 100 | 98. |

No significant variation in the tan $\delta_{max,23°\,C.}$ characteristic is noted between the compositions CA and CB.

Compositions CC1 and CC2 and CD1 and CD2

The compositions CC and CD have the following formulations (expressed in phr: parts per 100 parts of elastomer).

|  | CC1 | CD1 | CC2 | CD2 |
| --- | --- | --- | --- | --- |
| Elastomer C | 100 |  | 100 |  |
| Elastomer D |  | 100 |  | 100 |
| CARBON BLACK | 4.00 | 4.00 | 3.00 | 3.00 |
| SIL160MP | 110 | 110 | 70 | 70 |
| RESIN | 60 | 60 | 40 | 40 |
| ANTIOXIDANT | 3.80 | 3.80 | 2.75 | 2.75 |
| LIQUID SILANE | 8.80 | 8.80 | 5.60 | 5.60 |
| STEARIC ACID | 3.00 | 3.00 | 2.00 | 2.00 |
| DPG | 2.40 | 2.40 | 1.60 | 1.60 |
| ZNO | 0.90 | 0.90 | 0.90 | 0.90 |
| CBS | 2.30 | 2.30 | 2.4 | 2.4 |
| SULFUR | 1.00 | 1.00 | 1.00 | 1.00 |

Carbon black ASTM grade N234 from Cabot Corporation
Z1165MP silica from Rhodia, type HDS
PR-383 resin from ExxonMobil chemicals
Antioxidant: N-(1,3-dimethylbutyl)-N'-phenyl-p-phenylenediamine, from the company Flexsys
TESPT Si69 silane, from Degussa
DPG: Diphenylguanidine ("Perkacit" DPG from the company Flexsys)
CBS: N-cyclohexyl-2-benzothiazole-sulfenamide ("Santocure CBS" from the company Flexsys)

The difference in the tan $\delta_{max,23°\,C.}$ values between the compositions CC and CD is reported in the table below, taking the elastomer C as reference in each formula:

|  | CC1 | CD1 | CC2 | CD2 |
| --- | --- | --- | --- | --- |
| Tan delta max 23° C. in base 100 | 100 | 95 | 100 | 91 |

A significant variation in the tan $\delta_{max,23°\,C.}$ characteristic is noted between the compositions CC and CD.

Compositions CE and CF

The compositions CE and CF have the following formulations (expressed in phr: parts per hundred parts of elastomer).

|  | CE | CF |
| --- | --- | --- |
| Elastomer E | 100 |  |
| Elastomer F |  | 100 |
| CARBON BLACK | 4 | 4 |
| SILICA | 110 | 110 |
| ANTIOXIDANT | 3.9 | 3.9 |
| RESIN | 82 | 82 |
| LIQUID SILANE | 11 | 11 |
| STEARIC ACID | 3 | 3 |
| DPG | 2.4 | 2.4 |
| ZNO | 0.9 | 0.9 |
| CBS | 2.3 | 2.3 |
| SULFUR | 0.9 | 0.9 |

Carbon black ASTM grade N234 from Cabot Corporation
Z1165MP silica from Rhodia, type HDS
PR-383 resin from ExxonMobil chemicals
Antioxidant: N-(1,3-dimethylbutyl)-N'-phenyl-p-phenylenediamine, from the company Flexsys
TESPT Si69 silane, from Degussa
DPG: Diphenylguanidine ("Perkacit" DPG from the company Flexsys)
CBS: N-cyclohexyl-2-benzothiazole-sulfenamide ("Santocure CBS" from the company Flexsys)

The difference in the tan $\delta_{max,23°\,C.}$ values between the compositions CE and CF is reported in the table below:

|  | CE | CF |
| --- | --- | --- |
| Tan delta max 23° C. in base 100 | 100 | 88 |

A more than significant variation in the tan $\delta_{max,23°\,C.}$ characteristic is noted between the compositions CE and CF.

Results:

The results reported in Tables 1 to 3 above show that the use of modified diene elastomers according to the invention allows a significant and unexpected improvement in the hysteresis of the rubber compositions containing them compared with the use of modified diene elastomers having an identical microstructure and having undergone the same modification. These results are, in the present case, indicative of an improvement in the rolling resistance of a tire comprising, in particular as tread, a composition according to the invention.

The invention claimed is:

1. A rubber composition based on at least a reinforcing filler, a crosslinking system, a plasticizing system and an elastomer matrix comprising at least one modified diene elastomer comprising within its structure at least one alkoxysilane group, which is optionally partially or totally hydrolysed to silanol, bonded to the elastomer by the silicon atom, the alkoxysilane group optionally bearing another function bonded to the silicon atom directly or by means of a spacer group, which modified diene elastomer is such that the diene elastomer has a polydispersity index of at least 1.1 and at most 1.6 before modification, and has a Mooney viscosity ranging from 50 to 80 and a glass transition temperature (Tg) of less than or equal to −60° C. and greater than or equal to −110° C.

2. A rubber composition according to claim 1, wherein the modified diene elastomer has a glass transition temperature (Tg) of greater than or equal to −95° C. and less than −80° C.

3. A rubber composition according to claim 1, wherein the modified diene elastomer has a glass transition temperature (Tg) of greater than or equal to −80° C. and less than or equal to −60° C.

4. A rubber composition according to claim 1, wherein in the modified diene elastomer, the alkoxysilane group bears another function bonded to the silicon atom by means of a spacer group defined as a saturated or unsaturated, cyclic or non-cyclic, linear or branched, divalent $C_1$-$C_{18}$ aliphatic hydrocarbon-based radical, or a divalent $C_6$-$C_{18}$ aromatic hydrocarbon-based radical, said spacer group optionally containing one or more aromatic radicals and/or one or more heteroatoms.

5. A rubber composition according to claim 1, wherein the diene elastomer comprises at least 70% by weight of the functionalized linear diene elastomer, relative to the total weight of the modified diene elastomer.

6. A rubber composition according to claim 5, wherein the functionalized linear diene elastomer is predominantly functionalized in the chain middle by the alkoxysilane group, which is optionally partially or totally hydrolysed to silanol, the silicon atom bonding the two branches of the diene elastomer.

7. A rubber composition according to claim 6, wherein the diene elastomer functionalized in the chain middle by an alkoxysilane group represents at least 80% by weight of the functionalized linear diene elastomer.

8. A rubber composition according to claim 1, wherein the modified diene elastomer comprises at most 30% by weight, relative to the total weight of the modified diene elastomer, of a diene elastomer star-branched with tin or with silicon.

9. A rubber composition according to claim 8, wherein the diene elastomer is star-branched with silicon and the silicon atom bonded directly to three branches of the diene elastomer bears another function.

10. A rubber composition according to claim 1, wherein the other function borne by the silicon atom comprises at least one heteroatom selected from N, S, P and O.

11. A rubber composition according to claim 10, wherein the other function is a protected or non-protected primary amine, protected or non-protected secondary amine, or tertiary amine function, which is cyclic or non-cyclic or an isocyanate, imine, cyano, protected or non-protected thiol, carboxylate, epoxide, protected or non- protected, primary or secondary phosphine, or tertiary phosphine function.

12. A rubber composition according to claim 1, wherein the modified diene elastomer has at least one of the following features:
   the modified diene elastomer comprises at least 70% by weight of the linear diene elastomer functionalized predominantly in the chain middle, relative to the total weight of the modified diene elastomer,
   the modified diene elastomer comprises at most 30% by weight, relative to the total weight of the modified diene elastomer, of a species star-branched with three branches by a group comprising a silicon atom bearing another function,
   the other function is a tertiary amine,
   the other function is bonded to the silicon atom by a spacer group defined as a linear aliphatic hydrocarbon-based radical,
   the alkoxysilane function is a methoxysilane or an ethoxysilane, which is optionally partially or totally hydrolysed to silanol, and
   the diene elastomer is a butadiene polymer.

13. A rubber composition according to claim 12, wherein the modified diene elastomer has the following features:
   the alkoxysilane group bears a tertiary amine function,
   the star-branched diene elastomer comprises a silicon atom bearing a tertiary amine function,
   the spacer group is a linear $C_3$ hydrocarbon-based radical,
   the alkoxysilane group is a methoxysilane or ethoxysilane, which is optionally partially or totally hydrolysed to silanol,
   the diene elastomer is a butadiene/styrene copolymer,
   the modified diene elastomer comprises at least 75% by weight of the linear diene elastomer functionalized predominantly in the chain middle and at most 25% by weight of the star-branched diene elastomer, relative to the total weight of the modified diene elastomer.

14. A rubber composition according to claim 1, wherein the reinforcing filler includes silica.

15. A rubber composition according to claim 14, wherein the reinforcing filler comprises the silica in an amount of more than 50% by weight, relative to the total weight of the reinforcing filler.

16. A rubber composition according to claim 1, wherein the reinforcing filler is within proportions between 30 and 155 phr.

17. A rubber composition according to claim 1, wherein the modified diene elastomer is a butadiene/styrene copolymer and has a content of vinyl units relative to the diene portion ranging from 8% to 25% by weight, and a styrene content of at most 20% by weight relative to the total weight of the modified diene elastomer.

18. A rubber composition according to claim 17, wherein the modified diene elastomer is a butadiene/styrene copolymer and has a content of vinyl units, relative to the diene portion, ranging from 8% to 15% by weight, and a styrene content of at most 5% by weight relative to the total weight of the modified diene elastomer.

19. A semi-finished rubber article for tires, wherein the rubber article comprises a crosslinkable or crosslinked rubber composition according to claim 1.

20. A tire comprising: a semi-finished article as defined in claim 19.

* * * * *